US012534300B1

(12) United States Patent
Unitsky (10) Patent No.: US 12,534,300 B1
(45) Date of Patent: Jan. 27, 2026

(54) CARGO TRANSPORT COMPLEX

(71) Applicant: Anatoli Eduardovich Unitsky, Minsk Region (BY)

(72) Inventor: Anatoli Eduardovich Unitsky, Minsk Region (BY)

( * ) Notice: Subject to any disclaimer, the term of this patent is extended or adjusted under 35 U.S.C. 154(b) by 0 days.

(21) Appl. No.: 19/278,126

(22) Filed: Jul. 23, 2025

(30) Foreign Application Priority Data

Jul. 26, 2024 (EA) .................................. 202491937

(51) Int. Cl.
*B65G 15/40* (2006.01)
*B65G 17/02* (2006.01)
*B65G 21/08* (2006.01)
*B65G 21/22* (2006.01)

(52) U.S. Cl.
CPC ............. *B65G 15/40* (2013.01); *B65G 21/08* (2013.01); *B65G 2201/04* (2013.01)

(58) Field of Classification Search
CPC ........ B65G 15/40; B65G 17/02; B65G 21/08; B65G 21/22
USPC ........................................................ 198/818
See application file for complete search history.

(56) References Cited

U.S. PATENT DOCUMENTS

| | | | |
|---|---|---|---|
| 2,732,059 A | 1/1956 | Erisman | |
| 5,031,753 A * | 7/1991 | Tschantz | B65G 15/08 198/825 |
| 5,088,920 A | 2/1992 | Reunamaki | |
| 5,526,922 A | 6/1996 | Clark | |
| 6,481,566 B1 * | 11/2002 | Horak | B65G 21/14 198/595 |
| 7,571,803 B2 * | 8/2009 | Trieb | B65G 21/04 198/817 |
| 7,866,463 B2 * | 1/2011 | Brunone | B65G 15/60 198/819 |
| 8,418,840 B2 * | 4/2013 | Trieb | B65G 21/04 198/817 |
| 9,650,113 B2 * | 5/2017 | Pletz | B65G 67/606 |
| 11,591,162 B2 * | 2/2023 | Sansone | B65G 15/08 |
| 2016/0332822 A1 | 11/2016 | Brewka | |

(Continued)

FOREIGN PATENT DOCUMENTS

| | | | | |
|---|---|---|---|---|
| CN | 106586372 | | 4/2017 | |
| DE | 102019219482 A1 * | | 6/2021 | ............. B65G 21/22 |
| EP | 1452466 A1 * | | 9/2004 | ............. B65G 21/04 |

(Continued)

*Primary Examiner* — Douglas A Hess
(74) *Attorney, Agent, or Firm* — Harness, Dickey & Pierce, PLC (57) ABSTRACT

The apparatus is related to cargo transport systems, that use rail track structure as main transport for continuous hauling of lumpy and loose cargoes over distances of increased length. The apparatus is based on the task of creating a suspended-type cargo transport complex with the possibility of its use over significant distances of about 1,000 km and more. The claimed cargo transport complex, installed on supports above ground surface, consists of two strands—cargo strand and return strand, which form track structure. The cargo strand is equipped by a loading drum, whereas the return strand—by an unloading drum. Alternatively, loading-unloading devices may include bypass rollers instead of the drums for both loading and unloading. Both strands are fixed in load-bearing carcasses installed on each of the supports.

14 Claims, 4 Drawing Sheets

(56) References Cited

U.S. PATENT DOCUMENTS

2017/0341870 A1   11/2017   Lurie

FOREIGN PATENT DOCUMENTS

| WO | WO-2019079859 A1 | * | 5/2019 | ............. B65G 21/22 |
| WO | WO-2019241316 A1 | * | 12/2019 | ............. B65G 69/18 |
| WO | WO-2023209636 A1 | * | 11/2023 | ............. B65G 15/08 |
| WO | WO-2024017644 A1 | * | 1/2024 | ................ B61F 5/24 |

* cited by examiner

CARGO TRANSPORT COMPLEX

CROSS-REFERENCE TO RELATED APPLICATION

The present application claims priority to the Eurasian Patent Organization patent application No. 202491937, filed on Jul. 26, 2024, which is incorporated by reference herein.

BACKGROUND AND SUMMARY

The invention is related to cargo transport systems that use a rail track structure, and can be used as a main transport device for continuous hauling of lump and bulk cargo, in particular for moving rock from a mine or deposit over long distances. In this context, "rock" means all free (unbound) material to be removed from a mine (quarry) and includes both overburden and minerals (ore) and waste rock.

A rail conveyor system is known in Russian Patent No. 2600021, comprising a rail track, a plurality of trolleys located at a distance from each other, a flexible cable connecting said trolleys and providing tension and the ability to change the distance between the trolleys, and an endless carrier belt carried by the trolleys, wherein the trolleys are mounted with the ability to move on wheels supported by the rail track, and each of them has at least three wheels, of which two wheels or more wheels are located at a distance from each other in the direction of movement so that each trolley independently supports the rail track. The rail conveyor system according to the invention combines the main advantages of belt conveyors and railway systems. Such a rail conveyor system is a system for continuous transportation of bulk material, which, due to the use of steel wheels moving on steel rails, has a rolling resistance of the same magnitude as in railway systems, and at the same time has all the advantages of continuous delivery of cargo inherent in known belt conveyor systems. The disadvantages of this system include high material consumption and, accordingly, cost, as well as the possibility of using it over relatively short distances.

A cargo transport complex by Yunitski with a circular traffic is known in Eurasian Patent No. 037219, regarded as a prototype, containing a frame with a track structure, equipped with loading-unloading zones, as well as turn-around units, a body formed by a supporting belt part, equipped with reinforcing elements and uniformly distributed and secured along the length of the body by transverse axles equipped with wheels on both sides, and a drive mechanism connected to the body, wherein the track structure includes rail cords containing prestressed in the longitudinal direction load-bearing members of the rail cords and a body with a rolling surface for the wheels, and the supporting belt part of the body contains a longitudinally located load-bearing member of the body, prestressed by a longitudinal tension force, wherein the drive mechanism is made in interaction with traction devices located on the body, connected to the load-bearing member of the body, as well as support beams having a grooved profile of depth H, m, located with a pitch L, m, with justified ratios of the depth of the grooved profile, width S, m, of the supporting belt part and the pitch L, m, the location of the support beams. Hereby, the turn-around switches (nodes) are made with a certain radius R, m, the rail cords on the turn-around node are made with an inclined section that ensures the tilt of the body in the transverse direction at an angle γ, °, located within the range from 45 до 120°, and the unloading zone is located on the said inclined section of the turn-around node of the track structure.

The disadvantages of the prototype include the fact that the supporting belt part of the body is subject to significant longitudinal stresses, which lead to rapid wear thereof and reduces the overall length of the cargo route; in addition, the known cargo transport complex features an increased accommodation area due to the presence of turn-around switches in the horizontal plane.

The invention is based on the task of creating a suspended-type cargo transport complex with the possibility of its use over significant distances—about 1,000 km and more. The solution to the problem is aimed at achieving the following technical goals:

increasing the reliability and durability of the transport complex;

increasing the length of the cargo route with an increase in the transverse rigidity of the track structure between loading and unloading points;

ensuring an increase in the productivity of the transport complex.

The technical objectives in accordance with the task of the invention make it possible to create a cargo transport complex consisting of cargo and return strands secured in a load-bearing frame on supports, equipped with a drive mechanism, loading-unloading devices, and containing a track structure with prestressed and tensioned with a longitudinal tension force $F_R$, N, rail cords, resting thereon bogies with support wheels, distributed along the track structure with a pitch of L, m, and a cargo-handling belt placed in the bogies, which is made tensioned with a longitudinal tension force $F_G$, N, wherein the bogies and the cargo-handling belt placed therein are made with a grooved profile with a depth of H, m, and a width of S, m, the differences whereof in accordance with the invention consist in the fact that traction belts rigidly connected to the bogies are made tensioned with a longitudinal tension force $F_T$, N, wherein the following ratio is achieved:

$$0.07 \leq (F_G + F_T)/F_0 \leq 0.7,$$

where $F_0$, N,—the smallest of the tension forces at break of the cargo-handling belt or the traction belt, the drive mechanism includes traction wheels interacting with the traction belts, moreover, the bogies are connected to each other by extended connecting elements placed along the track structure and tensioned with a longitudinal tension force $F_S$, N, satisfying the ratio:

$$0.05 \leq F_S/F_0 \leq 0.5,$$

loading and unloading devices are additionally equipped with pulling rollers for pulling the cargo-handling belt, whereby the loading-unloading devices include a loading drum and an unloading drum, configured to move bogies, traction belts and extended connecting elements; or loading-unloading devices include bypass rollers on an arcuate guide, configured with possibility of moving trolleys, traction belts and extended connecting elements.

Preferably, the rail cords contain prestressed, longitudinally tensioned load-bearing elements, and the tension force of the rail cords $F_R$, N, is equal to the sum of the longitudinal tension forces of the load-bearing elements and the bodies of the rail cords, if present. The achievement of technical goals is facilitated by the fact that the track structure is connected to the supports by means of carcasses. The traction belts can be fixed longitudinally along the edges of the cargo-handling belt. The embodiments are possible, wherein the traction belts are secured along the outer edges of the bogies in which the cargo-handling belt is placed. Usually, the cargo is placed on the cargo-handling belt of the cargo strand.

The achievement of the technical task is also ensured by the fact that the values of the ratios of the depth H, m, width S, m, of the grooved profile of the cargo-handling belt and pitch L, m, of location of the bogies are determined by the dependencies:

$0.5 \leq H/S \leq 1.5$, $0.1 \leq S/L \leq 1$.

A protective cover can be installed above the conveyor belt—a roof equipped with a seal. The achievement of the technical task is also ensured by the fact that the cargo-handling belt is made of multiple layers. Hereby, at least one layer of the cargo-handling belt is provided with reinforcing elements.

The drive mechanism can be made in the form of a load-bearing frame with a drive unit installed there. Hereby, the drive unit is equipped with a drive device connected to the traction wheels with the ability to regulate the drive force. Non-limiting embodiments of the claimed invention also possible, wherein the cargo strand has a larger quantity of load-bearing crossbars and/or load-bearing elements of the rail than the return strand. The achievement of the technical result is also facilitated by the fact that the track structure is configured with a 180° turn of the cargo-handling belt—in the section thereof at the loading point—in front of the loading drum, and in the section thereof at the unloading point-after the unloading drum.

BRIEF DESCRIPTION OF THE DRAWINGS

The essence of the proposed invention is explained with the use of drawings (FIGS. 1-8), which depict the following.

DETAILED DESCRIPTION

Designations: 1—support; 2—cargo strand; 3—return strand; 4—track structure; 5—loading drum; 6—unloading drum; 7—bypass roller; 7.1—pulling roller; 8—carcass; 8.1—load-bearing crossbar; 8.2—suspension; 9—rail cord; 10—load-bearing element; 11—bogie; 12—drive mechanism; 13—support wheel; 14—cargo-handling belt; 14.1—cargo; 15—traction belt; 16—traction wheel; 17—connecting element; 18—roof; 19—seal; 20—180°-return mechanism.

Figure 1:
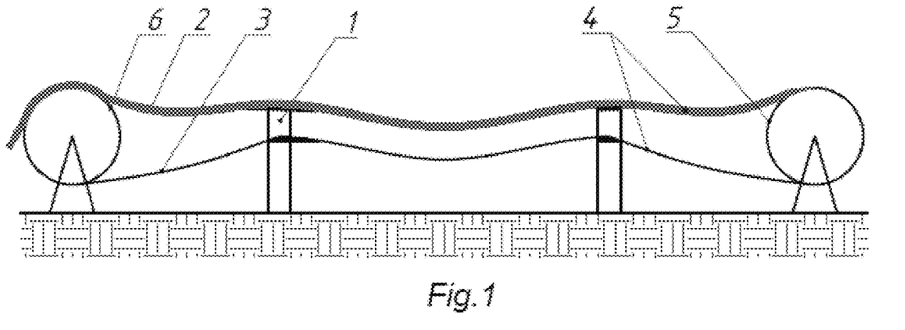
FIG. 1—schematic representation of a cargo transport complex.
Figure 2:
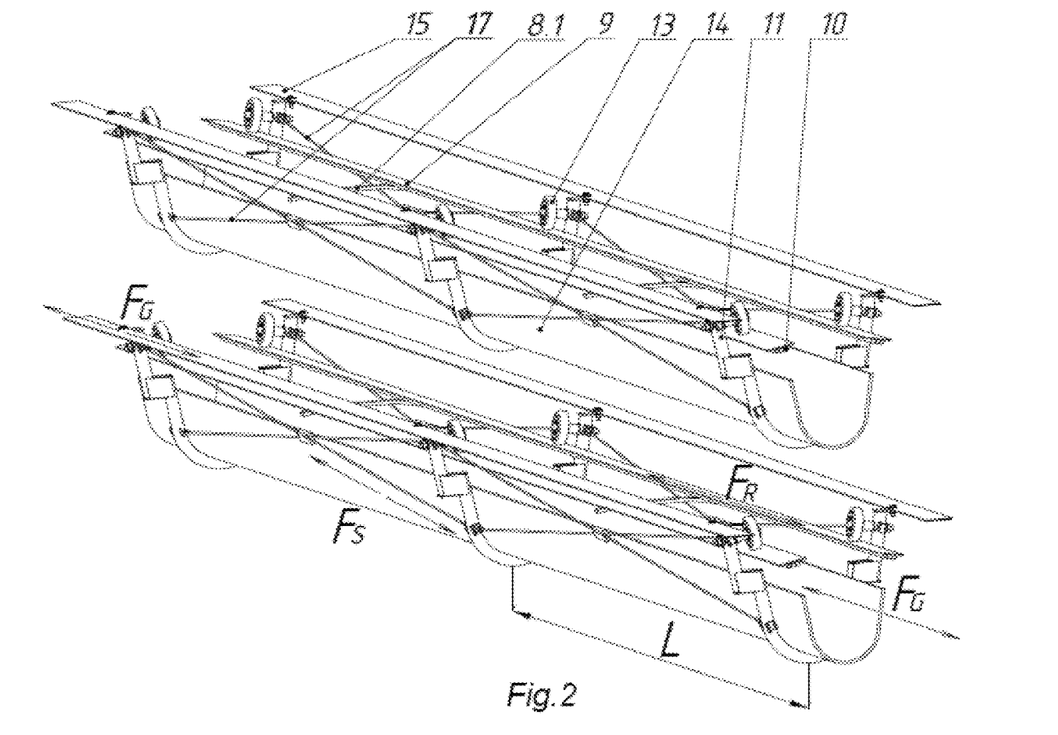
FIG. 2—fragment of the multidrawing of the cargo strand, conventionally shown without cargo, and the return strand.

In more detail, the essence of the invention is as follows. The claimed cargo transport complex, installed on supports 1 above the earth's (water's) surface, consists of two strands located one below the other in a vertical plane, or, alternatively,—in a matched horizontal plane—of a cargo strand 2 and a return strand 3 (FIG. 1), which contain track structure 4. The cargo strand 2 is equipped with a loading drum 5, the return branch—with an unloading drum 6, forming loading-unloading devices. Alternatively, the loading-unloading devices can include, instead of the loading and unloading drums, bypass rollers 7 (shown in FIG. 8) for both loading and unloading. Both strands are secured in supporting carcasses 8 installed on each of the supports. The track structure 4 includes prestressed and tensioned with a longitudinal tension force $F_R$, N, rail cords 9, which may contain prestressed load-bearing elements 10 (FIG. 2,4). The form-shaping basis for both strands of the cargo transport complex is constituted by bogies 11 supported by rail cords, wherein both strands are equipped with drive mechanisms 12. For resting on the rail cords, the bogies 11 are equipped with support wheels 13 interacting with the rolling surface of the rail cords and distributed along the track structure with a pitch of L, m. A cargo-handling belt 14 is placed in the bogies, which is made tensioned with a longitudinal tension force $F_G$, N, wherein the bogies and the cross-section of the cargo-handling belt placed therein are made with a grooved profile of depth H, m, and a width S, m, (FIG. 2, 3, 5). Cargo 14.1 can be distributed on the cargo-handling belt in the cargo strand 2 of the transport complex.

The difference between the claimed invention and prior art analogues is as follows:

the cargo transport complex contains traction belts 15 rigidly connected to the cargo-handling belt 14 (either directly to the cargo-handling belt, or through rigid fastening on the bogies 11, or by means of simultaneous realization of rigid connections both with the cargo-handling belt and the bogies) and tensioned with a longitudinal tension force $F_T$, N, whereby the following ratio is satisfied:

$$0.07 \leq (F_G+F_T)/F_0 \leq 0.7, \qquad (1)$$

where $F_0$, N—the smallest of the tension forces at break of the cargo-handling belt or the traction belt;

the drive mechanism 12 includes traction wheels 16 interacting with traction belts 15;

the bogies are connected to each other by extended connecting elements 17, arranged along the track structure and tensioned with a longitudinal tension force $F_S$, N, satisfying the condition:

$$0.05 \leq F_S/F_0 \leq 0.5. \qquad (2)$$

The specified values of the ratio (1) highlight the optimal range of longitudinal tension forces of the cargo-handling belt and the traction belts, and make it possible to ensure without any particular difficulties the operational characteristics of the above-mentioned belts, providing for the formation of the optimal profile of the bogie 11 and its required process pressure on the rail cords 9 of the track structure 4. As a result, they ensure the estimated productivity and dynamics of unloading the cargo 14.1.

If the ratio (1) is less than 0.07, it is impossible to ensure the formation of a bogie of the required shape and rigidity, which leads to losses of the cargo 14.1 during its transportation; if the ratio (1) is more than 0.7, the cargo and traction belts will be in an overstressed state, will have virtually no margin of safety, which will lead to a decrease in the reliability and durability of the cargo transport complex. If the ratio (2) is less than 0.05, the connecting element will have an unacceptably low ability to hold the main parts of the cargo transport complex in a stationary state in the event of an emergency (for example, breakage of the traction and/or cargo-handling belts); if the ratio (2) is more than 0.5, the connecting element will have excessive tension, which will lead to a decrease in the reliability and durability of the cargo transport complex and to a possible breakage of the connecting element. The extended connecting elements 17 connect the bogie carcasses together, setting the distance therebetween. In the event of an emergency, they allow maintaining the integrity of the cargo transport complex.

The track structure 2 includes rail cords 9 containing longitudinally prestressed load-bearing elements 10 and a body (if any), as well as load-bearing crossbars 8.1, rigidly fixing the mutual transverse arrangement of the rail cords and repeating along the track structure with a certain periodicity. At the same time, in various particular cases of embodying the cargo transport complex, the following distinguishing features can be realized in the track structures:

- the track structure has a greater number of load-bearing crossbars and/or load-bearing elements of the rail cords in the cargo strand than in the return strand;
- the track structure of both strands has an equal number of load-bearing crossbars and/or load-bearing elements of the rail cords;
- the load-bearing crossbars are installed with variable periodicity in the longitudinal direction;
- the load-bearing crossbars may be positioned with variable suspension height on suspensions in the longitudinal direction;
- the load-bearing elements and the bodies of the rail cords are preferably in a prestressed state; wherein the tension force of the rail cords $F_R$, N, is equal to the sum of the longitudinal tension forces of the load-bearing elements and the bodies of the rail cords, if any;
- the load-bearing elements in the rail cords of both or one of the strands may be absent;
- the rail cords of both or one of the strands may be made bodyless.

Figure 5:
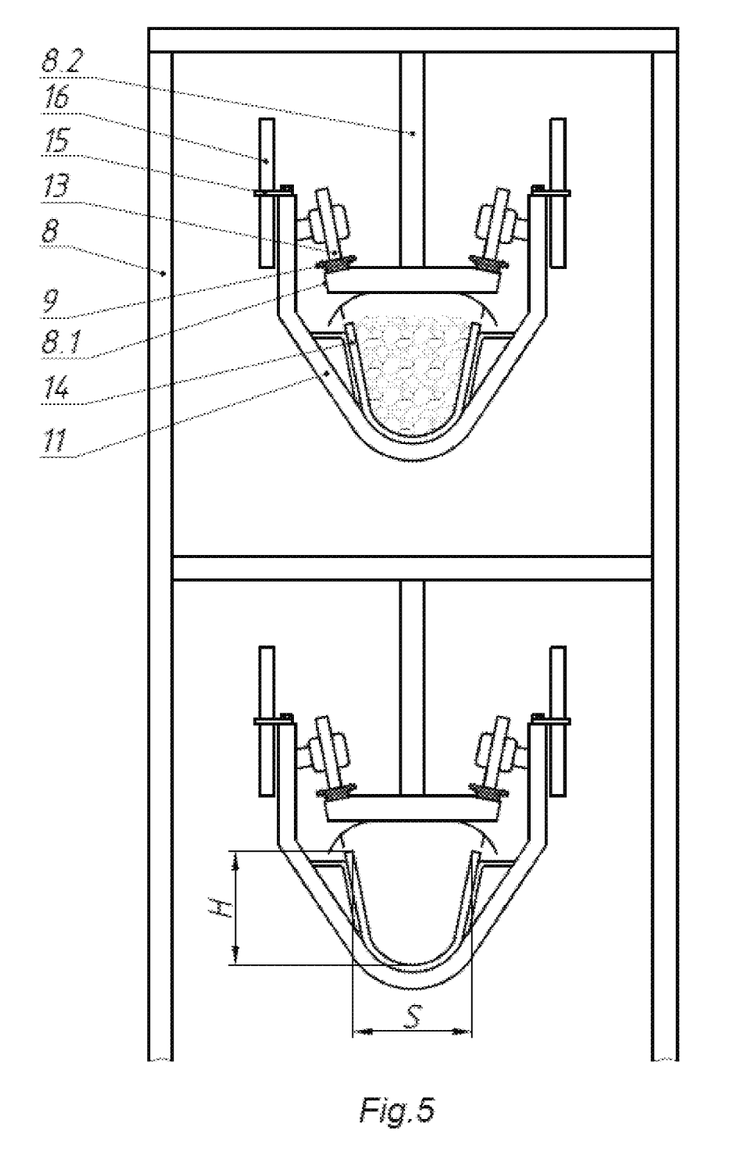
FIG. 5—schematic cross-section of the of the suspended-type cargo transport complex.

The use of the rail cords 9 in the form of prestressed longitudinally structure for the track structure 4 allows to provide for the straightness of the rail cords 9, increases the load-carrying capacity of the track structure 4, and, consequently, the productivity of the entire complex while reducing the overall material consumption with an increase in the transportation distance of cargo 14.1 from the point of its loading to the point of unloading. The track structure 4 is fastened to the supports 1 using carcass 8, a particular embodiment of which is shown in FIG. 5. The load-bearing crossbars 8.1 connect the rail cords together. Suspension 8.2 allows to set the height of the rail cords and the bogies resting thereon in the span between the supports.

Figure 3:
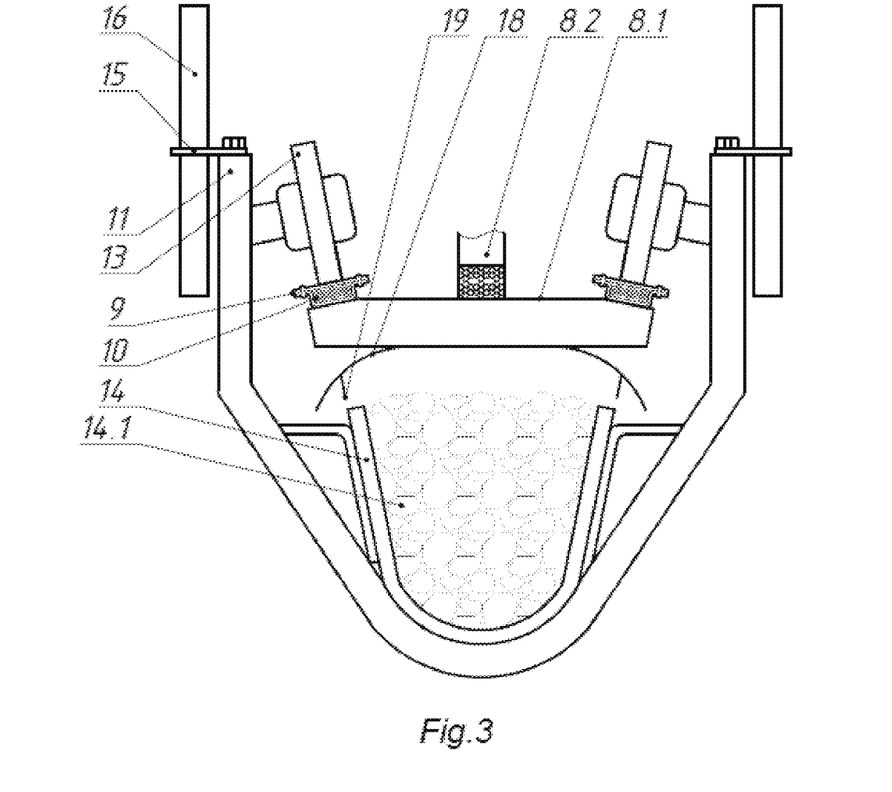
FIG. 3—cross-section of the track structure.
Figure 4:
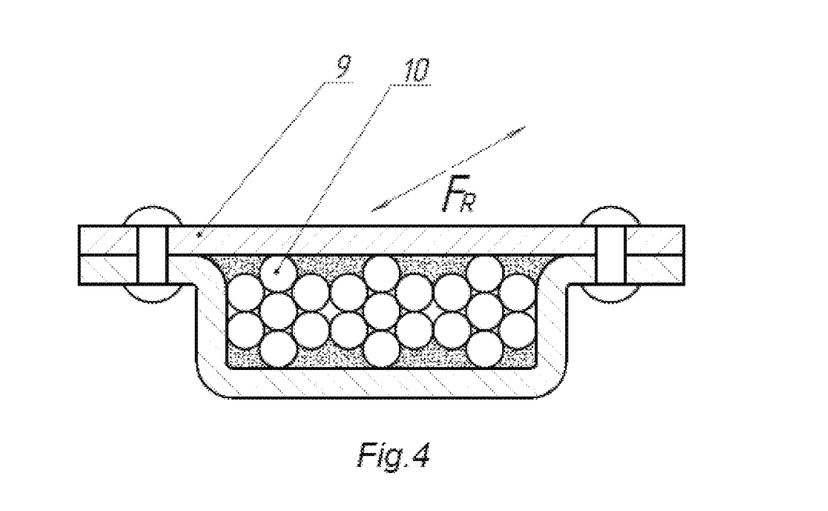
FIG. 4—cross-section of the rail cord.

The bogie 11 is formed preferably by the grooved bogie carcass, the cargo-handling belt 14 placed thereon, also acquiring the grooved profile, whereon the cargo 14.1 is placed in the cargo strand, support wheels 13 rigidly fixed thereto, extended connecting elements 17 and traction belts 15, fixed preferably longitudinally along the outer edges of the bogie (FIG. 2, 3, 5). Alternatively, the traction belts can be fixed along the edges of the cargo-handling belt (FIG. 3). The support wheels 13 are preferably fixed on the axle 21 to form a pair of wheels 13.1. Fixing the traction belts on the two edges of the bogie carcass and applying traction force thereto makes it possible to release the cargo-handling belt from the direct traction action, which extends its service life and ultimately increases the reliability of the cargo transport complex. The formation of a pair of wheels 13.1, which rigidly connects pairs of support wheels, allows to increase the rigidity of the cargo transport complex as a whole and in particular to limit the swing of the bogies in the transverse direction, which reduces the loss of cargo in the cargo strand.

Figure 8:
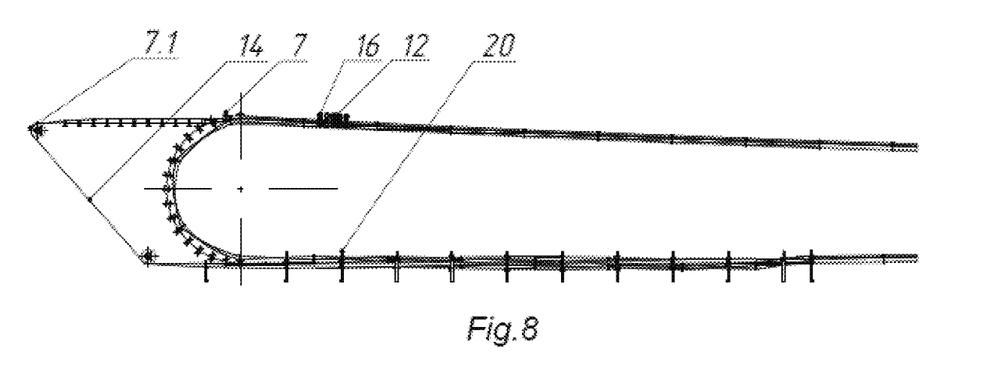
FIG. 8—longitudinal fragment of the unloading section of the cargo transport complex with bypass rollers.

The loading-unloading devices are located at the loading point, at the unloading point, correspondingly, and represent a loading drum 5 and an unloading drum 6, through which the traction belts and the bogies with extended connecting elements 17 move. The diameter of the drums 5, 6 is determined based on the maximum bending forces applied to the traction belts. Alternatively, instead of drums 5, 6, the loading-unloading devices are represented by bypass rollers 7 (as shown in FIG. 8), located on the edges of the arcuate guides, through which the traction belts and the bogies with extended connecting elements 17 move.

Figure 6:
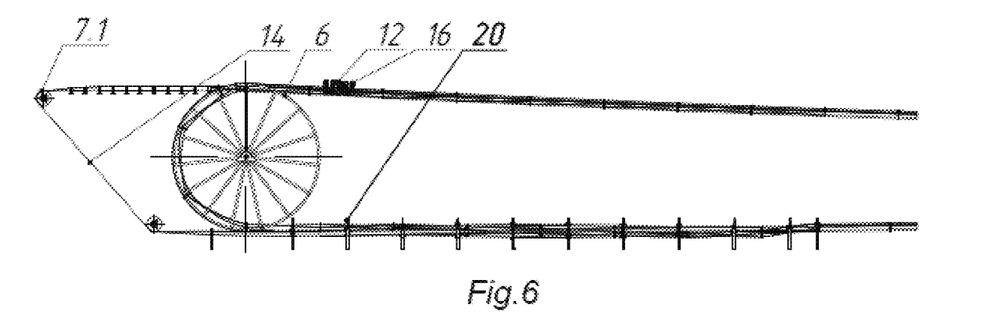
FIG. 6—longitudinal fragment of the unloading section of the suspended-type cargo transport complex.
Figure 7:
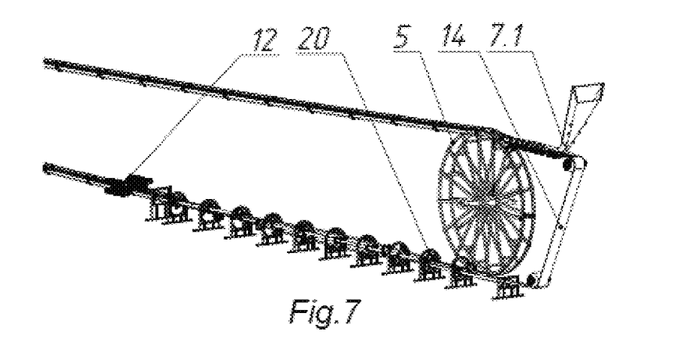
FIG. 7—multi-fragment of the loading section of the suspended-type cargo transport complex.

Another difference from analogues and the prototype is that the loading-unloading devices (both in the form of drums 5, 6 and in the form of bypass rollers 7) are additionally equipped with pulling rollers 7.1 for pulling the cargo-handling belt (FIG. 6, 7). This ensures a reversing of movement of the cargo-handling belt separately and independently from the bogies connected by the extended connecting elements 17, and the traction belts, which ensures the constancy of the tension force $F_G$ of the cargo-handling belt, as well as the separation of the tension forces $F_T$ of the traction belts, $F_S$ of the extended connecting elements and $F_G$ of the cargo-handling belt and eliminates the unauthorized entry of bulk cargo onto the components of the transport complex during loading and unloading.

For correct positioning, the cargo-handling belt is subject to a 180° turn in its part located at the loading point—in front of the loading drum, and in the part located at the unloading point—after the unloading drum. On drums 5 and 6 (in an alternative embodiment—bypass rollers 7), the traction belts with the bogie carcasses are turned over by 180°, whereby the cargo-handling belt has a greater length relative to the traction belts and is pulled onto additional pulling rollers 7.1, which allow dividing the position of drums 5, 6 and the cargo loading-unloading points themselves in space, if necessary, to carry out additional tensioning of the cargo-handling belt, and also to turn the cargo-handling belt over by 180° (FIG. 6-8). For correct positioning in the strands of the bogies with traction belts after passing the loading-unloading devices, they must be turned over again by 180° on the 180° turn mechanisms 20. These devices are located at the beginning of the return strand after the unloading drum and at the end of the return strand in front of the loading drum; the cargo-handling belt is also turned over thereon (FIG. 6-7). After a double turn by 180° and loading of cargo in the cargo strand, the cargo-handling belt is placed on the carcasses of bogies with traction belts; it is also placed in the return strand on the carcasses of bogies after unloading and a double turn by 180°. This makes it possible to create loading-unloading devices with optimal material consumption; in addition, the preconditions are created for the possible movement of other cargo along the return strand.

To form the profile of the bogie 11, it is advisable that the carcass of the bogie (and, accordingly, the shape of the cargo-handling belt after laying on the bogie carcass) be made in a grooved form (FIGS. 2, 3 and 5), while the values of the ratios of the depth H, m, width S, m, of the grooved profile of the cargo-handling belt and pitch L, m, of the location of the bogies are determined by the dependencies:

$$0.5 \leq H/S \leq 1.5, \quad (3)$$

$$0.1 \leq S/L \leq 1 \quad (4)$$

When making a grooved cargo-handling belt profile with a depth of H, m, of profile and width S, m, with the values corresponding to the ratio (3), it is possible to ensure the optimal shape of the bogie in the cross section.

If the ratio (3) is less than 0.5, then to ensure the estimated productivity of the cargo 14.1 transportation, a load-bearing belt of significant width S, m, as well as suspensions designed for a large load on the tension force, will be required, which will lead to an increase in the material intensity of the cargo transport complex. If the ratio (3) is more than 1.5, then a cargo-handling belt of increased width will also be required, which again will lead to an increase in the material intensity of the cargo transport complex.

The values of width S, m, of the cargo-handling belt 14 and the pitch L, m, of the arrangement of the bogies specified in the ratio (4) highlight the optimal range of these dimensions. If the ratio (4) is less than 0.1, the productivity of the transport complex will decrease and material consumption thereof will increase. If the ratio (4) is more than 1, the load on the cargo-handling belt will increase significantly, which will lead to a decrease in the reliability of the cargo transport complex.

The load-bearing cargo-handling belt 14 is preferably made of multiple layers. Furthermore, at least one of its layers is equipped with reinforcing elements. This allows to increase its reliability, strength and ensure its operational characteristics.

In order to increase the efficiency of the transport complex and reduce the impact of the environment on the transportation of cargo 14.1, it is advisable to secure a roof 18 with a seal 19 (FIGS. 3 and 5) over the cargo-handling belt with cargo. Providing the roof with the seal 19 will also reduce cargo losses during transportation. In this case, the roof may be absent on certain sections of the track structure (for example, on the return strand).

In any of the non-limiting embodiments of the claimed cargo transport complex, preferably at least one drive mechanism 12 is installed on each strand, connected to the bogie 11 and the cargo-handling belt 14 by means of interaction with the traction wheels 16 installed in the form of a group on the track structure 4 and perceiving the drive force (FIGS. 6-8). Increasing the number of drive mechanisms 12 installed on the cargo transport complex makes it possible to increase the productivity and range of transportation of cargo 14.1 to the required value. The drive mechanism 12, depending on the design solution, can be made by any methods selected from among the known ones, providing the transmission of the drive force to the traction wheels 16.

For example, the drive mechanism 12 can be made as a separate unit in the form of a unit secured to a load-bearing frame with a drive unit mounted thereon, connected to the engine (not shown in the figures). In turn, the drive unit is equipped with a drive device with traction wheels 16 mounted thereon with the ability to regulate the drive force applied thereto, which is transmitted to the traction belt 15. The drive of the drive mechanism 12 is provided by any of the known types of engines with the corresponding transmission and drive to the drive unit.

The claimed suspended-type cargo transport complex is realized as follows. In accordance with the design solution, supports 1 are erected, at the loading point-loading drum 5 and pulling rollers 7.1, at the unloading point-unloading drum 6 and pulling rollers 7.1. Then, on the supports, with use of carcasses 8, and on drums 5 and 6, the track structure 4 is formed, starting with the placement of rail cords 9. The rail cords are in a prestressed state in the longitudinal direction due to the presence of load-bearing elements 10; their transverse placement between the supports is fixed by the load-bearing crossbars 8.1, and the suspension height is adjusted by suspensions 8.2. Such creation of rail cords ensures the required straightness, strength and rigidity of the track structure 4.

Then, the bogie carcasses are hung on the installed rail cords, placing the support wheels 13 on the rail cords. On the bogie carcasses, according to the shape of their profile, a cargo-handling belt 14 is placed, acquiring a grooved profile, stretched with a longitudinal tension force $F_G$, N, and then connected into a ring. After this, the traction belts 15, which are in a taut state with a longitudinal tension force $F_T$, N, are fastened to the bogie carcasses on both sides in any suitable way, and then are joined into a ring. Then, on both sides, the connecting bogies are joined to each other to the formed bogies 11, and the connecting elements 17, tensioned with a tension force $F_S$, N, are attached. Traction wheels 16 are installed in groups on the traction belts, connected to the drive device of the drive unit of the drive mechanism 12. At least one drive mechanism is installed on each of the strands 2 and 3.

The claimed suspended-type cargo transport complex operates as follows. Under the action of the drive mechanism 12, the drive force is transformed into rotation of the traction wheels, which sets in motion the traction belts and the cargo-handling belt with the bogies. At the loading point, the cargo-handling belt is uniformly loaded with cargo 14.1, as it moves, it is placed on the bogie carcasses and moves at a constant speed along the cargo strand to the unloading drum, where separation occurs: the bogie carcasses with traction belts move along the unloading drum, where they are turned over by 180°, and the cargo—handling belt with cargo-along the pulling rollers, where unloading occurs and then the cargo-handling belt turned over by 180° at the beginning of the return strand is reunited with the inverted bogie carcasses and traction belts. Then, on the 180°-return mechanism, the cargo-handling belt with the bogies and traction belts are turned over again by 180° and move at a constant speed to the loading drum, in front of them, on a similar 180°-return mechanism, the cargo-handling belt with the bogie carcasses and traction belts are turned over and then the cargo-handling belt on the pulling rollers, and the bogie carcasses with the traction belts—on the loading drum are turned over again, occupying the correct position in front of the loading point and then the cycle is repeated (FIG. 1).

While this application describes preferred embodiments of the structure design, it is clear that the claimed invention is not limited thereto and can be embodied using other known design elements within the scope of the specified set of essential features of the invention. The cargo transport complex of the described design allows to construct a high-tech cargo transport system with rail track structure of a suspended rail type, with enhanced operational characteristics while reducing its cost and increasing productivity and durability.

The invention claimed is:

1. A cargo transport complex comprising:
   a cargo and a return strands secured in a load-bearing carcass on supports, equipped with a drive mechanism, loading-unloading devices, and containing a track structure including prestressed and tensioned with a longitudinal tension force $F_R$, N, rail cords, with resting thereupon bogies with support wheels, distributed along the track structure with a pitch L, m, and a cargo-handling belt placed in the bogies, which is tensioned with a longitudinal tension force $F_G$, N, wherein the bogies and the cargo-handling belt accommodated therein have a grooved profile with a depth H, m, and a width S, m;

wherein traction belts are rigidly connected with the cargo-handling belt, and arranged tensioned with longitudinal tension force $F_T$, N, wherein the following ratio is attained:

$$0.07 \leq (F_G + F_T)/F_0 \leq 0.7,$$

where $F_0$, N—the smaller of the tension forces at break of the cargo-handling belt or traction belt; the drive mechanism includes traction wheels interacting with traction belts, furthermore, the bogies are connected to each other by extended connecting elements placed along the track structure and tensioned with a longitudinal tension force $F_S$, N, satisfying the ratio:

$$0.05 \leq F_S/F_0 \leq 0.5,$$

the loading-unloading devices are further equipped with pulling rollers for pulling the cargo-handling belt; and wherein the loading-unloading devices further include a loading drum and an unloading drum, configured to move the bogies, traction belts and extended connecting elements; or the loading-unloading devices include bypass rollers on an arcuate guide, configured to move the bogies, traction belts and extended connecting elements.

2. The cargo transport complex according to claim 1, wherein the rail cords contain prestressed, longitudinally tensioned load-bearing elements, wherein the tension force $F_R$, N of the rail cords is equal to the sum of the longitudinal tension forces of the load-bearing elements and the bodies of the rail cords.

3. The cargo transport complex according to claim 1, wherein the track structure is connected to the supports by load-bearing carcasses.

4. The cargo transport complex according to claim 1, wherein the traction belts are secured longitudinally on the edges of the cargo-handling belt.

5. The cargo transport complex according to claim 1, wherein the traction belts are secured longitudinally on the outer edges of the bogies, wherein the cargo-handling belt is placed.

6. The cargo transport complex according to claim 1, wherein cargo is placed on the cargo-handling belt of the cargo strand.

7. The cargo transport complex according to claim 1, wherein the values of the ratios of depth H, m, width S, m, of the grooved profile of the cargo-handling belt and pitch L, m, of location of the bogies are determined by the dependencies:

$$0.5 \leq H/S \leq 1.5,$$

$$0.1 \leq S/L \leq 1.$$

8. The cargo transport complex according to claim 1, wherein a protective cover is installed above the cargo-handling belt, the cover including a roof, equipped with a seal.

9. The cargo transport complex according to claim 1, wherein the cargo-handling belt is made of multiple layers.

10. The cargo transport complex according to claim 1, wherein at least one layer of the cargo-handling belt is provided with reinforcing elements.

11. The cargo transport complex according to claim 1, wherein the drive mechanism is made in the form of a load-bearing frame with a drive unit installed thereon.

12. The cargo transport complex according to claim 1, wherein the drive unit is equipped with a drive device connected to the traction wheels with the ability to regulate the drive force.

13. The cargo transport complex according to claim 1, wherein the cargo strand has a larger quantity of load-bearing crossbars and/or load-bearing elements of the rail cord than the return strand.

14. The cargo transport complex according to claim 1, wherein the track structure is configured with a 180° turn of the cargo-handling belt—in the section thereof at the loading point—before the loading drum, and in the section thereof at the off-loading point—after the unloading drum.

* * * * *